United States Patent [19]
Habijanec et al.

[11] Patent Number: 6,089,465
[45] Date of Patent: Jul. 18, 2000

[54] HEATER WITH EXHAUST OUTLET CONNECTION INTEGRATED INTO THE HEAT EXCHANGER

[75] Inventors: Stephan Habijanec, Krailling; Maximilian Hellwig, Gauting, both of Germany

[73] Assignee: Webasto Thermosysteme GmbH, Stockdorf, Germany

[21] Appl. No.: 09/188,383

[22] Filed: Nov. 10, 1998

[30] Foreign Application Priority Data

Nov. 11, 1997 [DE] Germany .................. 197 49 821

[51] Int. Cl.[7] .................................................. B60H 1/02
[52] U.S. Cl. ............................ 237/12.3 C; 237/12.3 B
[58] Field of Search .......................... 237/12.3 C, 2 A, 237/12.3 A, 12.3 R, 12.3 B

[56] References Cited

U.S. PATENT DOCUMENTS

| | | | |
|---|---|---|---|
| 4,471,754 | 9/1984 | Galtz ................................. | 126/110 B |
| 4,637,371 | 1/1987 | Rathel ............................... | 126/110 B |
| 4,944,454 | 7/1990 | Widemann et al. . | |
| 5,022,379 | 6/1991 | Wilson, Jr. ........................ | 126/116 R |
| 5,205,250 | 4/1993 | Easterly et al. .................. | 237/12.3 C |

*Primary Examiner*—Harold Joyce
*Assistant Examiner*—Derek S. Boles
*Attorney, Agent, or Firm*—Nixon Peabody LLP; David S. Safran

[57] ABSTRACT

A heater, especially an auxiliary motor vehicle heater, with a burner in a combustion chamber (2) which is surrounded by a generally pot-shaped, die cast heat exchanger (4) which has inner and outer parts (5, 6) and between which an intermediate space (11, 12) is formed through which a heat exchange medium flows, the combustion gases emerging from the combustion chamber (2) being discharged via a exhaust outlet connection (23). To increase the heat transfer efficiency and to minimize the size of the heater, on the outside of the open end of the heat exchanger inner part (5) a ring (15) is provided which projects, spaced apart from the outer peripheral wall (7) of the inner part, toward the bottoms (8, 10) of the heat exchanger parts. The intermediate space (11, 12) continues from between the peripheral walls (7, 9) of the inner and outer heat exchanger parts to between the ring (15) and the peripheral wall (7) of the inner part (5). The free end of the ring (15) of the inner part (6) tightly adjoins the open end of the heat exchanger outer part (6). The exhaust outlet connection (23) penetrates the ring (15), the intermediate space (11) and the inner part (5).

7 Claims, 1 Drawing Sheet

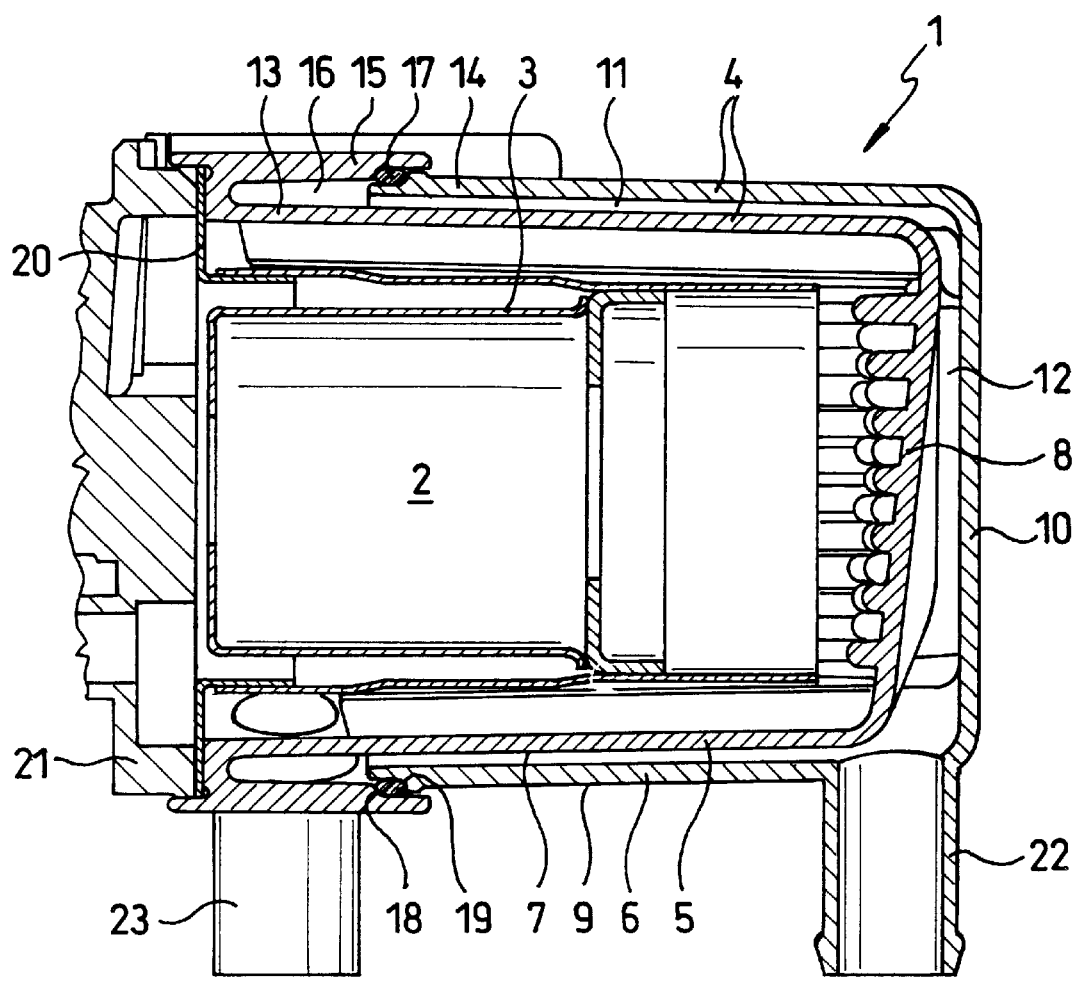

HEATER WITH EXHAUST OUTLET CONNECTION INTEGRATED INTO THE HEAT EXCHANGER

BACKGROUND OF THE INVENTION

1. Field of the Invention

The invention relates to a heater, especially an auxiliary motor vehicle heater, with a burner in a combustion chamber which is surrounded by a generally pot-shaped die cast heat exchanger that has an inner and an outer part, between which an intermediate space is formed through which a heat exchange medium flows. Combustion gases emerging from the combustion chamber are discharged via an exhaust outlet connection.

2. Description of Related Art

One such heater is known, for example, from German Patent DE 38 39 244 C2 and its counterpart U.S. Pat. No. 4,944,454. In this known heater, the exhaust outlet connection, as in all heaters, is provided with a die cast heat exchanger on a burner head which is flanged to the heat exchanger. In other words, the burner head represents an additional component of the heater for collecting and discharging exhaust gas. Since the heat exchange medium does not flow through the burner head, in the entire area of the burner head, which comprises roughly one third of the volume of the heater, heat cannot be withdrawn from the hot exhaust gases.

In heaters, for example, auxiliary motor vehicle heaters, in which the heat exchanger is made of steel, providing exhaust gas connections passing through the heat exchanger without an additional burner head is known. In the case of die cast heat exchangers, this construction was not considered for a long time, since the associated sealing problems were considered insurmountable.

SUMMARY OF THE INVENTION

In view of this prior art, the object of this invention is to devise a heater of the type mentioned which ensures optimum heat transfer also in the area of the exhaust outlet connection.

This object is achieved by the open end edge of a pot-shaped inner part of the heat exchanger having a ring which projects towards the closed end of the heat exchanger and which defines a continuation of an intermediate heat exchange space outwardly bounded by a pot-shaped outer part of the heat exchanger, an end edge of the ring tightly adjoining an open end edge of the heat exchanger outer part. Furthermore, an exhaust outlet connection penetrates the ring, the intermediate space and the inner part.

Accordingly, the invention calls for a special embodiment of the heat exchanger such that the exhaust outlet connection can be integrated without an additional burner head into the heat exchanger which is made as a die casting, the intermediate space through which the heat exchange medium flows extending into the area of the exhaust outlet connection. In other words, this is achieved, in particular, by cutting a one-piece, pot-like, double-walled heat exchanger structure in the area of the outside part or outer pot part at a distance underneath the heat exchanger edge away from the base and by connecting the separated parts by a sealing means at this point, this distance being so great that, in this heat exchanger area, an exhaust outlet connection can be used which is preferably part of the inside heat exchanger part and which is guided to the outside through the heat exchange medium jacket.

Advantageously, a seal structure is selected which comprises an O-ring which is located in an axial sealing seat in the separation area of the heat exchanger structure between the inner and outer parts.

The invention, thus, ensures direct routing of the exhaust gases through the heat exchange medium jacket, by which the burner head, which had been essential in the prior art for die cast heat exchangers, including its sealing to the heat exchanger, can be omitted. In addition, by the arrangement in accordance with the invention, the heat exchange medium flows through both the exhaust manifold and the exhaust outlet connection, the efficiency of the heat exchanger being clearly improved as compared to the construction with the burner head. In this way, a shortening of the heat exchanger length, and thus, a reduction of the size of the entire heater are possible in an especially advantageous manner.

In the following, the invention is explained by way of a single embodiment shown in the drawings.

BRIEF DESCRIPTION OF THE DRAWINGS

The sole FIGURE shows a longitudinal section through the combustion chamber/heat exchanger part of a heater in accordance with a preferred embodiment of the invention.

DETAILED DESCRIPTION OF THE INVENTION

The heater 1, which can be especially an auxiliary motor vehicle heater with liquid heat exchange medium, i.e. a water heater, conventionally is comprised of a burner (not shown) which projects into a combustion chamber 2 formed by a combustion pipe 3. The combustion chamber 2 is coaxially surrounded by a heat exchanger 4 which is formed of two die cast parts, specifically an inner part 5 and an outer part 6. The inner part 5 and the outer part 6 are each generally pot-shaped, the inner part being inserted into the outer part through the open end of the pot shape. In particular, the inner part 5 has a preferably cylindrical peripheral wall 7 and a bottom 8, and in a similar manner the outer part 6 has a peripheral wall 9 and a bottom 10. The bottom 8 of the inner part 5 is an inner structure in the form of projecting pins or ribs which can be easily removed from the mold due to the relatively simple shape of the inner part 5.

The inner part 5 is located in the outer part 6, leaving an intermediate space 11 between the peripheral walls 7 and 9 and an intermediate space 12 between the bottoms 8 and 10. In addition, the outer part 6 is axially shorter than the inner part 5 so that its open end 13 projects from the open end 14 of the outer part 6.

According to the invention, a ring 15 is molded onto the end 13 of the inner part 5 and projects in the direction toward the bottom 8 of the inner part 5. The ring 15 has a larger inner diameter than the inner part 5, and in the area of its free edge, the inner diameter roughly corresponds to the outer diameter of the outer part 6 in the area of the free edge of its end 14. The axial length of the ring 15 is chosen such that it fits around the end 14 of the outer part 6 with its end directed toward bottoms 8, 10, in a sealing manner, as is explained in particular below. Based on this structure, between the end 13 of the inner part 5 and the ring 15, there is an intermediate space 16 which represents a continuation of the intermediate space 11 between the pot-shaped body of the inner part 5 and the outer part 6 between its end 14 and bottom 10.

To seal the ring 15 relative to the edge of end 14 of the outer part 6, an O-ring 17 is used which is provided between the inside of the edge of the ring 15 and the outside of the outer part 6 in its edge area. For axial guidance and to ensure a radial sealing seat, the inside of the ring 15 is peripherally recessed in the area of its bottom-side end and in a similar way the outside of the outermost end of the edge 14 of the outer part 6 is recessed over its entire periphery. In this way, on the ring 15, an annular shoulder 18 and on the edge 14 of the outer part 16 an annular shoulder 19 are formed, and these shoulders are spaced apart in the axial direction to be able to hold the O—O-ring 17 in the radial sealing seat.

In the embodiment shown in the FIGURE, a portion of the ring 15 extends axially beyond the end 13 of the inner part 5 so as to project in a direction away from the bottom 8. This projecting portion of ring 15 is used for positioning as an axial bearing surface for the mounting structure 20 of the combustion pipe 3, and moreover, forms a receiver for the fan housing 21, only a portion of which is shown.

The intermediate spaces 11, 12 and 16, as follows from the FIGURE, are interconnected and form a common intermediate space through which a heat exchange medium, for example, water, flows. The heat exchange medium is supplied to this common intermediate space via a feed connection 22 and is discharged via an outlet connector (not shown), located in the area of the ring 15. The feed connection 22, in the embodiment shown, discharges into the bottom area of the heat exchanger 4, i.e. in the intermediate space 12.

The combustion gases emerging from the combustion chamber 2 during combustion are deflected in the area of the bottom 8 of the inner chamber into the area of the peripheral wall 7 and deliver their heat to the heat exchange medium flowing in the intermediate space 11, 12, 16, after which the combustion gases are discharged via an exhaust outlet connection 23.

According to the invention, the exhaust outlet connection 23, in contrast to the prior art relating to die cast heat exchangers, is not formed in a special burner head, but is integrated into the heat exchanger 4 in the area of the end 13, 14 of the inner and outer parts 5, 6. Accordingly the exhaust outlet connection 23 penetrates the ring 15, the intermediate space 12 in the ring area and the heat exchanger inner part 5 from the outside to the inside. The arrangement of the exhaust outlet 23 directly on the heat exchanger 4 yields an especially compact construction of the heat exchanger and thus of the heater 1, since a burner head as has been used for a long time as the support of the exhaust outlet can be omitted. In addition, the heat transfer length is advantageously elongated without increasing the length of the heater which can be reduced in contrast for a given heating output.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the of the appended claims.

We claim:

1. Heater for a motor vehicle comprising a burner in a combustion chamber which is surrounded by a generally pot-shaped heat exchanger made of generally pot-shaped die cast inner and outer parts between which an intermediate space is formed through which a heat exchange medium flows, and an exhaust outlet for discharging combustion gases emerging from the combustion chamber via an exhaust outlet connection; wherein a ring is formed on an edge of the inner part at an open end thereof, said ring being spaced apart from an outer side of a peripheral wall of the inner part and projecting in a direction toward a closed bottom of the inner part; wherein said intermediate space continues from between the peripheral wall of the inner part and a peripheral wall of the outer part to between the peripheral wall of the inner part and an inner peripheral wall of the ring, an end of said ring sealingly engaging an end of the peripheral wall of the outer part; and wherein the exhaust outlet connection penetrates the ring, the intermediate space and the inner part.

2. Heater as claimed in claim 1, wherein the ring is cast as one piece with the end of the inner part.

3. Heater as claimed in claim 1, wherein an O-ring seal is disposed between a shoulder on an outer side of the end of the outer part and a shoulder on an inner side of the end of the ring.

4. Heater as claimed in claim 3, wherein a portion of the ring projects beyond the open end of the inner part in a direction away from the closed bottom thereof.

5. Heater as claimed in claim 4, wherein said portion of the ring forms a receiver for a fan housing.

6. Heater as claimed in claim 1, wherein a portion of the ring projects beyond the open end of the inner part in a direction away from the closed bottom thereof.

7. Heater as claimed in claim 6, wherein said portion of the ring forms a receiver for a fan housing.

\* \* \* \* \*